United States Patent [19]

Titterington

[11] Patent Number: 4,729,135
[45] Date of Patent: Mar. 8, 1988

[54] FOOT OPERATED FLOW CONTROL ASSEMBLY FOR A SHOWERHEAD

[76] Inventor: Patrick Titterington, 215 SW. 1st Ct., No. 2, Pompano, Fla. 33060

[21] Appl. No.: 784,131

[22] Filed: Oct. 4, 1985

[51] Int. Cl.⁴ .............................................. F16K 31/12
[52] U.S. Cl. ................................. 4/597; 4/596; 4/615; 251/57; 251/305; 251/59; 239/578
[58] Field of Search ................. 239/578; 251/57, 305, 251/62, 59, 306; 92/120, 162 R; 4/596, 597, 602, 603, 615, 616

[56] References Cited

U.S. PATENT DOCUMENTS

| | | | |
|---|---|---|---|
| 862,867 | 8/1907 | Eggleston | 417/390 |
| 2,839,264 | 6/1958 | Trubert | 251/57 |
| 2,847,181 | 8/1958 | Muller | 251/306 |
| 2,966,328 | 12/1960 | Burnworth | 251/57 X |
| 2,996,049 | 8/1961 | Huska | 92/120 |
| 3,188,011 | 6/1965 | Ternullo | 239/578 |

FOREIGN PATENT DOCUMENTS

| | | | |
|---|---|---|---|
| 72790 | 11/1959 | France | 251/57 |
| 3674 | of 1901 | United Kingdom | 4/596 |

*Primary Examiner*—Gerald A. Michalsky
*Attorney, Agent, or Firm*—John C. Malloy

[57] ABSTRACT

A flow control assembly designed to regulate flow of water from a showerhead through a foot operated and fluid actuated valve assembly. The valve assembly is disposed upstream of a flow of water issuing from the showerhead and a variable volume chamber is mounted on the floor or base of a conventional receptacle such as a bathtub. Foot pressure applied to the variable volume chamber controls the flow of actuating fluid into and out of driving contact with the valve assembly thereby positioning the latter between a valve open and a valve closed position.

9 Claims, 6 Drawing Figures

FOOT OPERATED FLOW CONTROL ASSEMBLY FOR A SHOWERHEAD

BACKGROUND OF THE INVENTION

1. Field of the Invention

This invention relates to a flow control assembly designed to control water issuing from a showerhead and thereby conserve water by reducing the amount required to take a shower in that water does not continuously flow from the showerhead during the entire showering procedure but only issues therefrom, upon demand, for lathering or rinsing.

2. Description of the Prior Art

In a typical domestic shower system, a showerhead is positioned to direct a continuous stream of water over a person showering and into a receptacle, such as a bathtub, which includes a drain for removal of the water to a conventional sewage system. Prior to or at the beginning of the showering operation, a user adjusts the temperature and quantity of flow of water by typical hot and cold water faucets or a more modern single faucet regulating the amount of hot and cold water collectively. After the temperature and flow of issuing water has been adjusted, the flow of water is normally continuous until the showering procedure is over.

However, it is well known that while the flow or stream runs continuously throughout the showering procedure, such continuous flow is not necessary. To the contrary, those showering frequently remove certain parts of their body, such as the head and shoulders, from the stream of water for purposes of lathering. The person then steps under the continuously issuing stream of water for rinsing. It is well recognized that the above procedure while typical, wastes a great amount of water and in certain instances, a continuous stream is even inconvenient. However, the repeated stopping and starting of the stream of water issuing from the showerhead, using conventional faucet and valve structures associated with domestic showers, is inconvenient and even time-consuming. If separate hot and cold water faucets are utilized, the stopping of the issuing stream of water necessitates readjustment of flow rate and temperature once the stream has been shut off. This is inconvenient and frequently very uncomfortable if extremely cold or extremely hot water first issues from the showerhead during the adjustment period.

It is well accepted that much less water is generally required in a typical showering procedure then is actually utilized. Therefore, there is a need in the prior art for a flow control system for a shower which is easy to operate and effectively serves to regulate the flow of water issuing from the showerhead between an on and an off mode without the necessity of constantly readjusting the temperature and/or rate of flow of water using a conventional faucet and valve system normally associated with domestic showering facilities.

SUMMARY OF THE INVENTION

The present invention relates to a flow control assembly of the type specifically designed to regulate flow of water issuing from a showerhead without adjusting the conventional hot and cold water faucets or structurally installed valved assemblies. More specifically, the flow control assembly of the present invention comprises an actuating means preferably in the form of a platform disposed on the floor or base of a bathtub, drain floor or like facility in which water issuing from the showerhead is collected. The platform of the actuating means is structured to support one taking a shower thereon. In addition, the platform comprises a variable volume chamber which serves as a reservoir for activating fluid. The variable volume chamber is specifically structured such that it may be positioned into a reduced volume position such as by foot pressure or one standing on the platform at a designated location. Such reduced volume chamber forces the activating fluid from the reservoir through an interconnecting conduit means to a valve assembly located upstream of the showerhead and in flow regulating position relative to water issuing from the showerhead.

The valve assembly may be interconnected upstream of the showerhead, between the showerhead and the conventional domestic supply for both hot and cold water. Installation is made easy by unthreading the showerhead and attaching the valve assembly between the supply pipe and the showerhead.

The valve assembly includes a valve means which is normally disposed in its closed position due to the fact that a valve element, preferably a part of a butterfly valve assembly, is disposed in obstructing relation relative to the path of fluid flow. The valve element is maintained in such interruptive, obstructing position due to the biased disposition of a positioning element located within a positioning chamber which is also part of the valve means. Accordingly, water normally does not flow through the showerhead when the subject flow control assembly is made a part of the shower facilities. However, one taking a shower needs only to stand or apply foot pressure to the platform thereby disposing the variable volume chamber into a reduced volume position and forcing the activating fluid to flow from the reservoir defined by the variable volume chamber through the aforementioned interconnecting conduit means to the valve assembly.

The positioning element is disposed in direct fluid receiving relation to the distal end of the conduit means and thereby receives the full force of the activating fluid as it is forced from the reservoir through the conduit means into the valve assembly. The positioning element is movably mounted to travel within and along the length of a positioning chamber. Accordingly, forced flow of the activating fluid serves to force the positioning element towards the distal end of the positioning chamber. The valve element is connected to move with the positioning element thereby causing its rotation into a valve open position and allowing fluid flow.

If one desires to stop water issuing from the showerhead, he merely removes foot pressure from the platform thereby increasing the volume of the variable volume chamber from the reduced volume position and allowing activating fluid to flow, at least in part due to gravity, back to the conduit means into the reservoir and from within the positioning chamber. A biasing means associated with the positioning element thereby forces the positioning element back to its "normal" position and the valve element, due to the aforementioned interconnection, is forced into its closed position thereby stopping flow of water issuing from the showerhead.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DESCRIPTION OF THE PREFERRED EMBODIMENT

Figure 1:
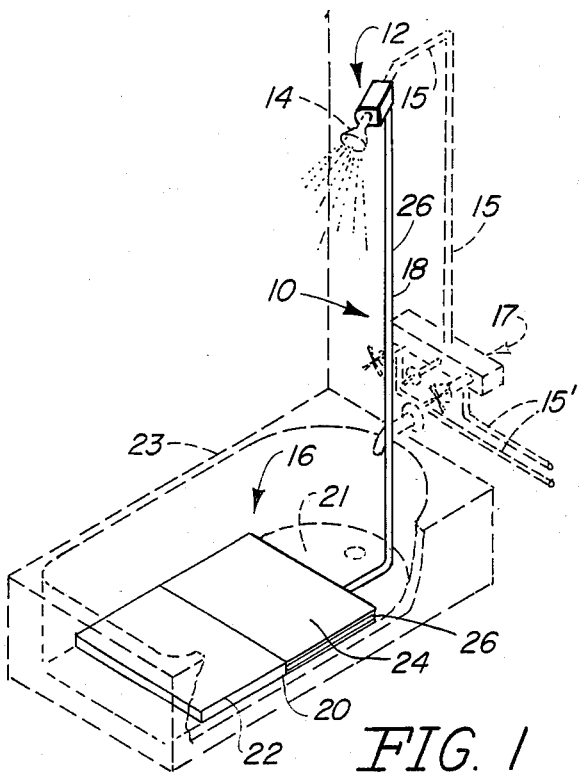
FIG. 1 is an isometric view of the flow control assembly of the present invention applied to a shower and bath facility represented in phantom lines.

As shown in FIG. 1, the flow control assembly of the present invention is generally indicated as 10 and includes a valve means 12 connected to the showerhead represented in broken lines as 14 between a water supply conduit 15 and the showerhead 14.

The flow control assembly further comprises an actuating means generally indicated as 16 and a conduit means 18 disposed in fluid communication and interconnecting relation between the actuating means 16 and the valve mean 12. More specifically, the actuating means 16 includes a platform 20 dimensioned and configured to be positioned on the floor or base 21 of a bathtub or like receptacle 23 of conventional design positioned to receive and collect the water issuing from the showerhead 14. The platform 20, in a preferred embodiment, includes a first portion 22 and a second portion 24. The first portion is structured to have sufficient integrity to allow a person to stand thereon such that the entire weight of the person showering may be supported on the first portion 22. The second portion 24 comprises a variable volume chamber which serves as a reservoir for activating fluid 26.

The second portion 24 of the platform 20 which at least partially defines the activating means is generally structured so as to effectively "collapse" into a reduced volume position when foot pressure is placed on the exposed surface of the second portion 24. Such reduced volume position will force the activating fluid 26 from the interior of the variable volume chamber through the length of the conduit means 18 and into activating position relative to the valve means 12, which will be explained in greater detail hereinafter. It should be obvious that the conduit means 18 effectively defines a path of fluid flow between the activating means 16 or reservoir and the valve means 12. Applying foot pressure to the second portion 24 and thereby positioning the variable volume chamber into its reduced volume position will serve to force the activating fluid 26 into activating position relative to the valve means 12 and, as will be explained in greater detail with regard to Figure 3, force the valve means into an open valve position allowing water to issue from the showerhead 14. Upon removing the foot pressure or force from the second portion 24 of platform 20 serves to automatically allow expansion of the variable volume chamber into its normal position thereby allowing fluid flow to pass, at least partially due to gravity, back down the path of fluid flow defined by conduit means 18 and out of driving engagement with the valve means 12.

The actual structure of the variable volume chamber associated with the second portion 24 of platform 20 may vary and may include a somewhat substantially conventional construction (not specifically shown for purposes of clarity) which may incorporate a collapsible wall, baffle, or like structure capable of being disposed into a reduced volume position forcing activating fluid 26 up into activating relation to the valve 12 as set forth above.

The valve means 12, in a preferred embodiment, is in the form of a butterfly valve and includes a valve element 30 secured to a positioning element 32 by a connecting finger 34. The positioning element 32 is movably disposed on the interior of positioning chamber 36 having a proximal end 36' disposed in fluid communication with a distal end 18' of conduit means 18. The positioning element 32 is capable of travel along the length of the positioning chamber 36 which in turn causes rotation of valve element 30 about a pivotal axis or supporting structure 38.

Figure 3:
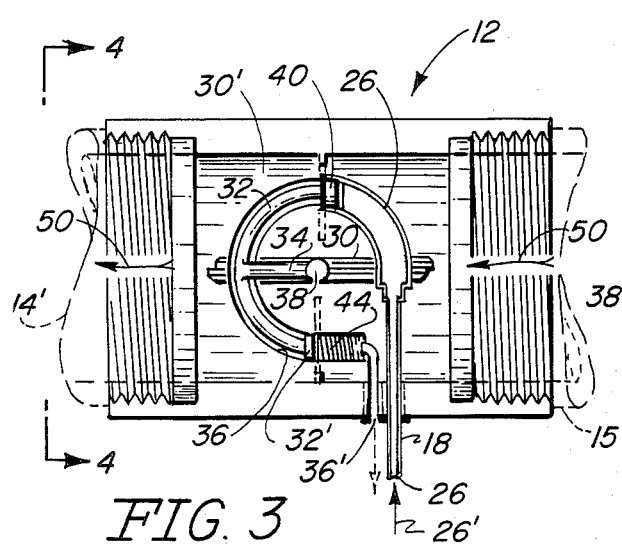
FIG. 3 is a cutaway view of the valve assembly generally represented in FIG. 2.
Figure 4:
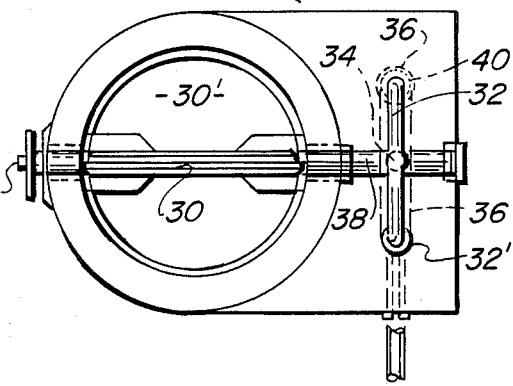
FIG. 4 is an end view along line 4—4 of FIG. 3.

The positioning element 32 includes a proximal end defined by head 40 specifically dimensioned and structured to be movable relative to the interior surface of the positioning channels 36 but provide a substantially sealing action therebetween such that activating fluid 26 cannot pass therebeyond into the remaining interior of the positioning channel 36. Accordingly, forced fluid flow of activating fluid 26 by foot pressure exerted on second portion 24 of platform 20 causes a driving action or contact of the activating fluid 26 with the head 40. As shown in FIG. 3, the activating fluid 26 is forced into driving engagement with head 40 and, due to a sealing action, the head 40 and the remainder of the positioning element 32 is forced or driven inwardly along the length of the positioning chamber 26. Directional arrow 26' indicates forced direction of activating fluid flow (FIG. 3). The opposite end of positioning chamber 26 is vented to atmosphere as at 36' so that forced movement or travel of positioning element 32 by activating fluid 26 will not encounter an back pressure by air forced from the positioning chamber 36 through vent 36'.

Figure 2:
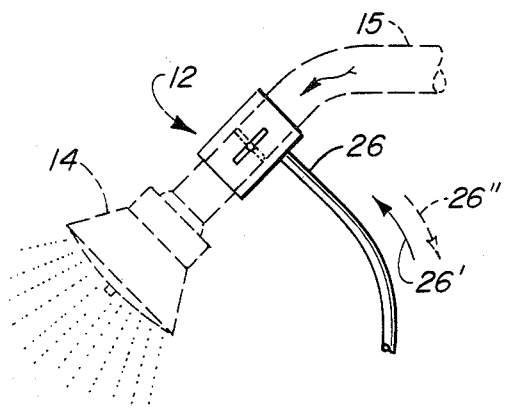
FIG. 2 is a detailed view in partial cutaway of a valve assembly of the present invention mounted upstream of a showerhead represented in phantom lines.
Figure 5:
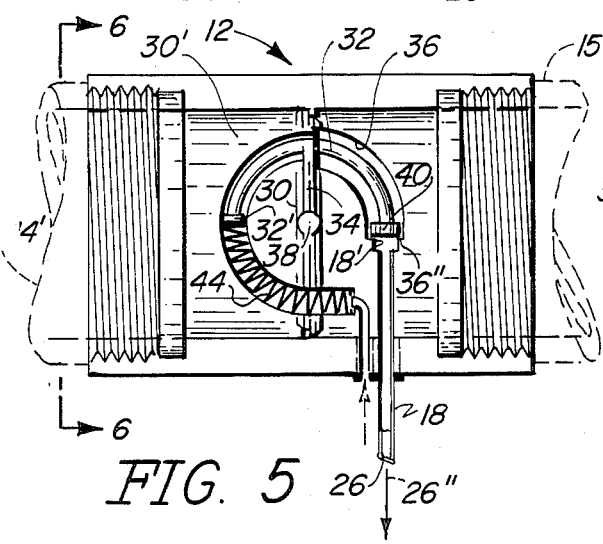
FIG. 5 is a cutaway view of the embodiment of Figure 3 wherein the valve assembly is shown in a valve closed position.
Figure 6:
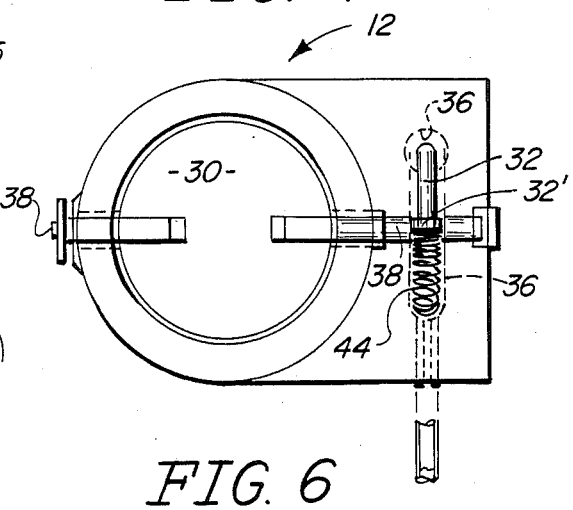
FIG. 6 is an end view along line 6—6 of FIG. 5.

Further, a biasing means in the form of a spring or like biasing element 44 is mounted in the distal end of positioning chamber 36 and into biasing engagement with the distal end 32' and thereby serving to normally bias the positioning element 32 into a valve closed position as indicated in FIG. 5. Forced flow of activating fluid 26 into driving engagement with head 40 serves to move or drive the positioning element 32 against the normal biasing force of biasing element 44. Accordingly, as the activating fluid 26 is forced into and through the proximal end 36'' of positioning chamber 36, the positioning element 32 is forced into the valve open position as shown in FIG. 3. Valve element 30 opens to its full open position based on its fixed connection with the positioning element 32 and its movement therewith. Directional arrows 50 indicate a valve open position and the allowance of water to flow through the valve means 12 and issue from showerhead 14. The release of the second portion 24 of platform 20 allows the variable volume chamber to assume its normal position and reduce the force gainst the activating fluid 26. Activating fluid 26 thereby passes from the positioning chamber 36 as indicated by directional arrow 26" (FIGS. 2 and 5) and passes back along the path of fluid flow defined by conduit means 18 at least partially due to gravity. In this position of the positioning element 32 relative to positioning chamber 36, the biasing element 44 assumes its normal position tending to bias positioning element 32 into the valve closed position as represented in FIG. 5.

In operation of the present invention, it should be noted that the activating fluid 26 is maintained in sufficient quantities within the system to substantially fill the reservoir of the variable volume chamber of the activating means 16 and also a majority of the conduit means 18. This will allow a minimal force to be applied to the second portion 24 in order to force the activating fluid 26 into its driving relation to the positioning element 32 of the valve means 12.

By virtue of the subject flow assembly, the conventional hot and cold water faucets and fixed plumbing fixtures generally indicated as 17 are not required to be turned on and off if it is desired to stop the waterflow temporarily while showering.

It is therefore to be understood that the following claims are intended to cover all of the generic and specific features of the invention herein described, and all statements of the scope of the invention which as a matter of language, might be said to fall therebetween.

Now that the invention has been described,
What is claimed is:

1. A foot operated control assembly primarily designed to regulate flow of water through a showerhead and into a conventional receptacle such as a bathtub, said assembly comprising:
   (a) a valve means for regulating water flow mounted adjacent a showerhead in water-regulating relation to a stream of water issuing therefrom,
   (b) an actuating means removably positionable on the bottom of a water catching receptacle such as a bathtub for controlling said valve means,
   (c) said actuation means comprising a platform assembly of sufficient dimension to support the weight of one showering by one standing thereon and having a fixed platform portion and a collapsible platform portion connected in adjacent, side-by-side relation to one another,
   (d) said collapsible platform portion having a variable volume chamber capable of assuming a reduced volume position upon pressure exerted thereon by the weight of one showering,
   (e) said variable volume chamber defining a contained reservoir of actuating fluid being movably disposed relative thereto when said variable volume chamber is in a reduced volume position,
   (f) conduit means located in interconnecting and fluid communication between said contained reservoir and said valve means and defining a path of fluid flow therebetween,
   (g) said actuating fluid at least partially maintained within said contained reservoir and said conduit means and along said path of fluid flow, said path of fluid flow including a distal end disposed adjacent said valve means and in fluid communication therewith,
   (h) said valve means including a positioning element movably mounted within a positioning chamber and positionable along the length thereof, said positioning chamber defining a continuation of said conduit means and being disposed in direct fluid receiving relation to the actuation fluid passing along said path of fluid flow from said conduit means,
   (i) said actuating fluid being movably disposed from said contained reservoir, along said path of fluid flow and into said positioning chamber in driving engagement with said positioning element upon said variable volume chamber assuming said reduced volume position,
   (j) both said positioning chamber and said positioning element comprising a substantially semi-circular configuration, said positioning element movable in a substantially arcuate path of travel upon interacting with said actuating fluid,
   (k) said valve means further including a valve element comprising a flat valve plate disposed transversely to said arcuate path of travel and connected to said positioning element in outwardly spaced relation thereto so as to be rotatable therewith about a diameter of said valve plate between a valve open and a valve closed position upon said positioning element interacting with said actuating fluid, said valve closed position and said valve open position defined respectively by said valve plate disposed transversely in blocking relation and in coplanar, non-blocking relation to the flow of water through said showerhead.

2. An assembly as in claim 1 wherein said valve open position is defined by said actuating fluid disposed within said positioning chamber beyond a first end thereof and said positioning element forced along the length of said positioning chamber towards a second end thereof.

3. An assembly as in claim 1 wherein said positioning element includes a head formed at one end thereof adjacent a first end of said positioning chamber, said head dimensioned and configured to form a seal with the interior surface of said positioning chamber and thereby prevent said activating fluid from bypassing said head and flowing into said positioning chamber.

4. An assembly as in claim 3 wherein said positioning chamber comprises a substantially semi-circular configuration and said positioning element is disposed in substantially coaxial relation to said chamber and being correspondingly configured along a length thereof.

5. An assembly as in claim 1 wherein said valve closed position is defined by said positioning element disposed adjacent a first end of a said positioning chamber and said actuating fluid disposed within said path of fluid flow and out of said positioning chamber.

6. An assembly as in claim 5 wherein said valve means further comprises a biasing means for normally biasing said positioning element into said valve closed position.

7. An assembly as in claim 6 wherein said biasing means is disposed adjacent a second end of said chamber and structured to normally bias said positioning element towards said first end of said positioning chamber and against a direction of travel of said actuating fluid into said positioning chamber.

8. An assembly as in claim 7 wherein said valve open position is defined by said actuating fluid disposed within said chamber beyond said first end thereof and said positioning element forced along the length of said positioning chamber towards said second end thereof and against said biasing means.

9. An assembly as in claim 1 wherein said valve means comprises a valve seat disposed about a periphery of a waterflow line upstream of the showerhead, said valve element positionable transversely across the flow of water into and out of sealing engagement with said valve seat.

* * * * *